(12) United States Patent
Salonen

(10) Patent No.: US 11,018,605 B2
(45) Date of Patent: May 25, 2021

(54) DC TO DC VOLTAGE CONVERTER AND VOLTAGE CONVERTER CONTROL SCHEME

(71) Applicant: L7 Drive Oy, Nummela (FI)

(72) Inventor: Daniel Salonen, Karjalohja (FI)

(73) Assignee: L7 Drive Oy, Karjalohja (FI)

(*) Notice: Subject to any disclaimer, the term of this patent is extended or adjusted under 35 U.S.C. 154(b) by 0 days.

(21) Appl. No.: 16/612,424

(22) PCT Filed: May 8, 2018

(86) PCT No.: PCT/FI2018/050337
§ 371 (c)(1),
(2) Date: Nov. 11, 2019

(87) PCT Pub. No.: WO2018/206846
PCT Pub. Date: Nov. 15, 2018

(65) Prior Publication Data
US 2020/0204093 A1    Jun. 25, 2020

(30) Foreign Application Priority Data
May 10, 2017  (FI) .................................. 20175422

(51) Int. Cl.
*H02P 6/08* (2016.01)
*H02M 3/158* (2006.01)
(Continued)

(52) U.S. Cl.
CPC ............ *H02P 6/08* (2013.01); *H02M 3/1582* (2013.01); *H02M 3/1584* (2013.01); *H02M 3/24* (2013.01); *H02P 7/292* (2013.01)

(58) Field of Classification Search
CPC ........ H02P 6/08; H02P 7/292; H02P 2201/07; H02M 3/1582; H02M 3/1584; H02M 3/24;
(Continued)

(56) References Cited

U.S. PATENT DOCUMENTS 5,506,456 A    4/1996 Yang
9,024,609 B2*  5/2015 Milavec .................. H02J 1/10
                                                     323/284
(Continued)

FOREIGN PATENT DOCUMENTS

EP    1195287 A2    4/2002
JP    H11332001 A   11/1999
JP    2008079447 A   4/2008

*Primary Examiner* — Emily P Pham
(74) *Attorney, Agent, or Firm* — Laine IP Oy

(57) ABSTRACT

According to an example aspect of the present invention, there is provided a DC to DC converter module for use between an electric power source and an electric motor. The DC to DC converter module having: a DC to DC converter; input terminals configured to provide a source voltage to the DC to DC converter from the electric power source; output terminals connected to outputs of the DC to DC converter and configured to provide an output voltage of the DC to DC converter module to the electric motor; and control circuitry connected to the DC to DC converter, the control circuitry having an input for receiving a signal indicative of a desired electric motor performance. The control circuitry being configured to control the DC to DC converter in order to adjust the output voltage based at least partially on the signal indicative of a desired electric motor performance.

18 Claims, 5 Drawing Sheets

(51) Int. Cl.
*H02M 3/24* (2006.01)
*H02P 7/292* (2016.01)

(58) Field of Classification Search
CPC ......... H02M 2001/0025; H02M 3/285; H02M 2001/007; H02M 3/156; H02M 3/335; H02M 3/158
See application file for complete search history.

(56) References Cited

U.S. PATENT DOCUMENTS

| | | | |
|---|---|---|---|
| 9,660,564 B2* | 5/2017 | Zhao | H02P 21/06 |
| 2006/0175996 A1* | 8/2006 | Tether | B63H 21/20 |
| | | | 318/376 |
| 2009/0051346 A1 | 2/2009 | Manabe et al. | |
| 2009/0108794 A1 | 4/2009 | Ochiai et al. | |
| 2009/0128117 A1* | 5/2009 | Ochiai | H02M 3/1582 |
| | | | 323/299 |
| 2012/0106204 A1 | 5/2012 | Imanishi et al. | |
| 2013/0119961 A1* | 5/2013 | Okuda | G05F 5/00 |
| | | | 323/299 |
| 2013/0134786 A1 | 5/2013 | Ishigaki et al. | |
| 2013/0287602 A1* | 10/2013 | Suzuki | F04B 49/06 |
| | | | 417/410.1 |
| 2016/0200202 A1* | 7/2016 | She | B60L 50/51 |
| | | | 307/10.1 |

* cited by examiner

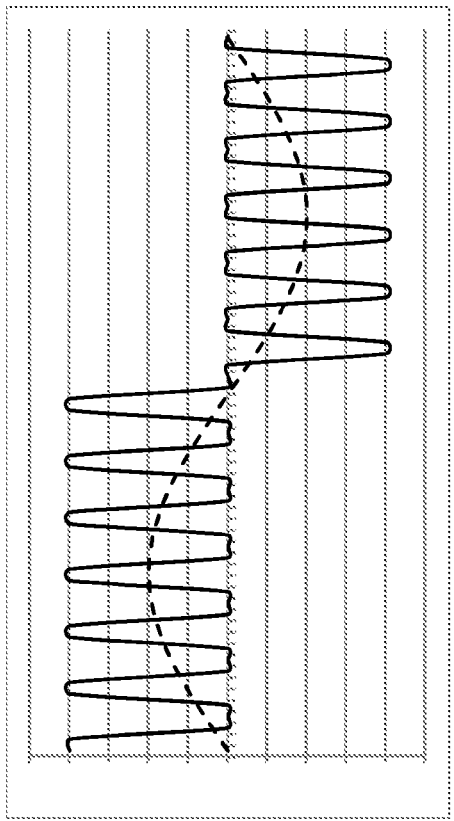
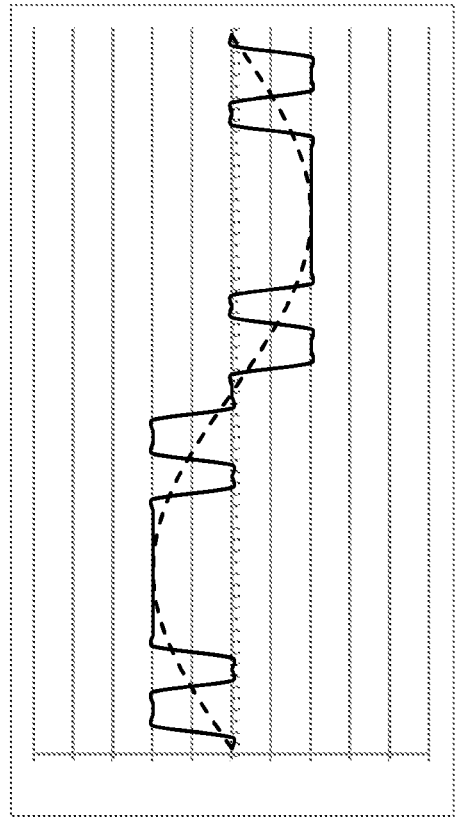
Figure 5A
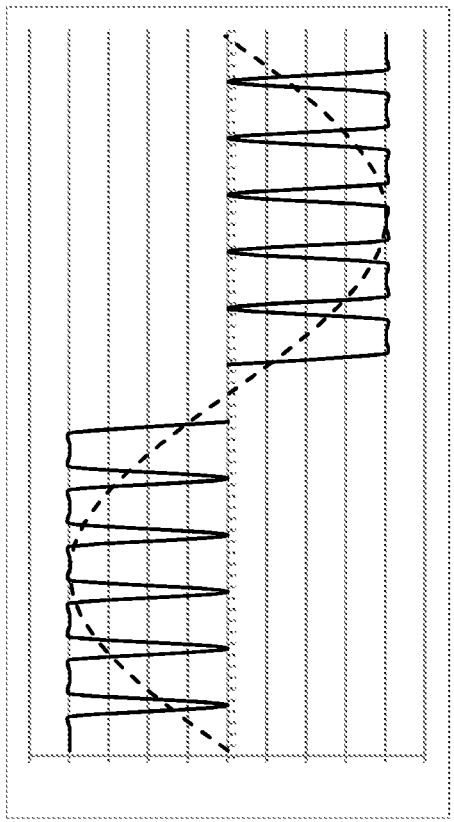
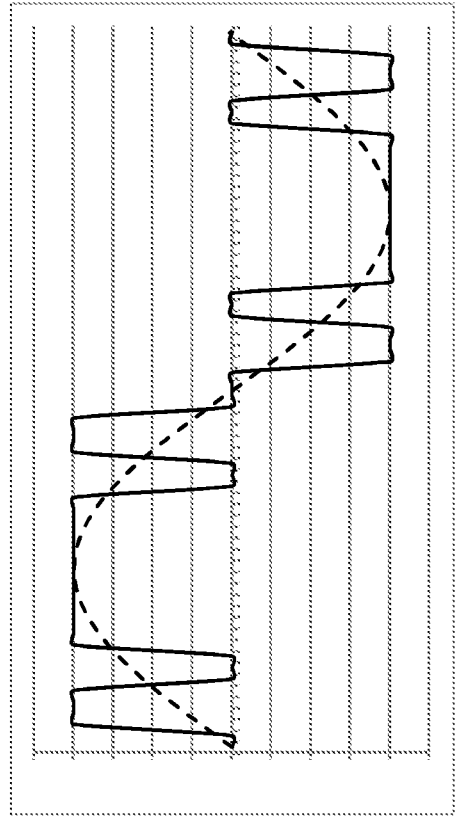
Figure 5B

DC TO DC VOLTAGE CONVERTER AND VOLTAGE CONVERTER CONTROL SCHEME

BACKGROUND

Many electric motors are designed to operate at a voltage between 300 V and 600 V. A single Li-ion battery cell supplies only between 3.2 and 3.7 V. Thus, these batteries are connected in series to provide a higher voltage from a battery pack. Within many applications the number of batteries connected in series is enough to supply the operating voltage of the motor. In certain applications, a remaining difference between the operating voltage of the motor and the battery pack voltage is managed by a DC to DC converter. After the desired operating voltage is achieved a controller or drive is used to arrive at the appropriate output for the desired motor performance. However, the DC to DC converters currently employed have a fixed conversion ratio and do not consider the demands being placed on the motor.

In many situations, for example in electric vehicles which spend a vast majority of the time with their electric motors operating at less than peak output, present power schemes are inefficient. Often a large number of individual battery cells are strung together creating a complicated system with a shortened battery life and a controller is consistently lowering the voltage output. This problem could be especially prevalent in, for example, vehicles used within an urban environment which may never employ the maximum motor potential due to slower speeds and lighter loads.

SUMMARY OF THE INVENTION

The present invention provides for an inventive DC to DC converter module that adjusts the output voltage of the module based on an input which is indicative of a desired motor performance of a motor connected to the converter module. This provides many benefits over present DC to DC converter modules. For example, a DC to DC converter module according to the present invention could enable more efficient use of batteries having fewer cells or even just a single cell leading to simplified systems with longer battery lives. This is enabled at least in part by the DC to DC converter module efficiently converting a relatively low voltage, such as 3.2 volts, to a voltage which may be employed to drive a motor.

The invention is defined by the features of the independent claims. Some specific embodiments are defined in the dependent claims.

According to a first aspect of the present invention, there is provided A DC to DC converter module for use between an electric power source and an electric motor, the DC to DC converter module comprising: a plurality of DC to DC converters; input terminals configured to provide a source voltage to the DC to DC converters from the electric power source; output terminals connected to outputs of the DC to DC converters and configured to provide an output voltage of the DC to DC converter module to the electric motor; and control circuitry connected to the DC to DC converters, the control circuitry having an input for receiving a signal indicative of a desired electric motor performance, wherein the control circuitry is configured to control the DC to DC converters in order to adjust the output voltage based at least partially on the signal indicative of the desired electric motor performance.

According to a second aspect of the present invention, there is provided a method for controlling a DC to DC converter module employed between an electric power source and an electric motor, the DC to DC converter module converting an input voltage provided by the electric source to an output voltage for powering the electric motor, the method comprising: monitoring a signal indicative of a desired performance characteristic of the electric motor; calculating an output voltage which would arrive at the desired performance characteristic; controlling the DC to DC converter module such that the input voltage is converted to the calculated output voltage.

BRIEF DESCRIPTION OF THE DRAWINGS

FIGS. 5A and 5B compare standard Pulse Width Modulation (PWM) and a new type of modulation which is enabled and indeed implemented by some embodiments of the present invention.

EMBODIMENTS

As discussed herein a DC to DC converter is a circuit, electronic component or electromechanical device that converts a source of Direct Current (DC) from one voltage level to another. DC to DC converters may be, for example: single-ended primary-inductor (SEPIC), Z, buck-boost, z-source, Cuk or boost converters.

Figure 1:
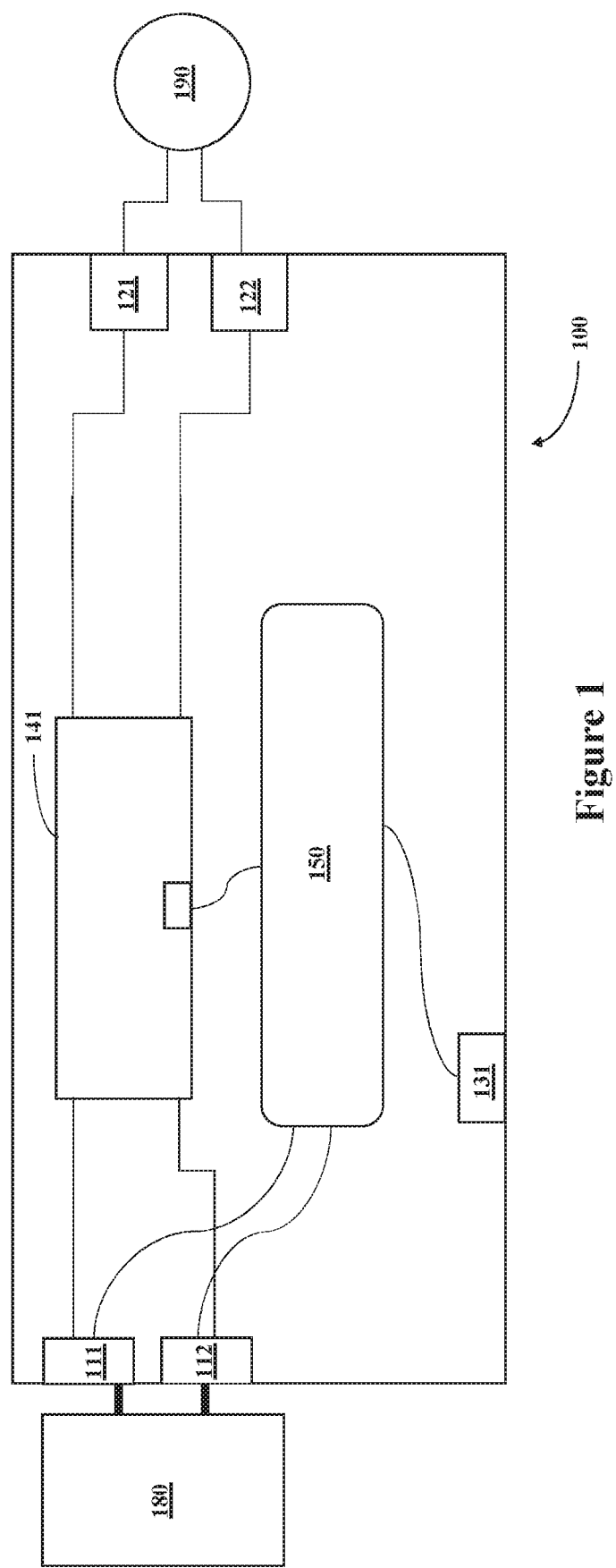
FIG. 1 illustrates a DC to DC converter module according to at least one embodiment of the present invention.

FIG. 1 illustrates a DC to DC converter module 100 according to an embodiment of the present invention is provided for use between an electric power source 180 and an electric motor 190. The DC to DC converter module 100 comprises a DC to DC converter 141 and input terminals 111, 112 configured to provide a source voltage to the DC to DC converter 141 from the electric power source 180. Output terminals 121, 122 are connected to outputs of the DC to DC converter 141 and configured to provide an output voltage of the DC to DC converter module 100 to the electric motor 190. Also provided within the DC to DC converter module 100 is control circuitry 150 connected to the DC to DC converter 141. The control circuitry 150 having an input 131 for receiving a signal indicative of a desired electric motor performance. The control circuitry 150 is configured to control the DC to DC converter 141 in order to adjust the output voltage based at least partially on the signal indicative of a desired electric motor performance. As seen, the control circuitry 150 may be connected to the input terminals 111, 112 so as to be able to determine an input voltage and thus the amount of adjustment necessary to arrive at the desired output voltage. Alternatively, control circuitry 150 may obtain the input voltage from DC to DC converter 141, for example.

At least some DC to DC converter modules according to the present invention are configured to receive a signal indicative of a desired electric motor performance which varies between an maximum and minimum value, unlike a mere on/off signal. For example, the module may be configured to receive a signal having a number of discrete values associated with an electric motor speed that are then used to determine the appropriate adjustment by the DC to DC converter. The module may also be configured to receive a continuously variable signal indicative of a motor speed.

Within certain embodiments of the present invention the DC to DC converter 141 receives a desired output from the control circuitry 150 and then independently monitors the input voltage so as to provide the appropriate voltage adjustment, for example, by adjusting the pulse ratio of the converter. Certain controllers 150 according to at least some embodiments of the present invention are configured to measure the voltage from the input terminals 111, 112 separately so as to be able to measure the battery capacity and protect the battery from being over charged or deep discharged.

Within the figures of the present application, conductively connected elements are illustrated by lines connecting two components as would be done in a standard electrical diagram.

The DC to DC converter module 100 of FIG. 1 may find use in, for example, a low voltage DC motor application. In such an application, DC to DC converters comprised in the module may be controlled to provide a voltage and current that would result in a desired performance of the DC motor. For example, when employed within a vehicle, the DC to DC converter module could receive an input from the throttle of the vehicle and adjust the output voltage based on the throttle input. When employed in such a fashion, a switch may further be provided between the DC to DC converter module 100 and the motor 190 in order to allow for stoppage of the motor.

Within some embodiments of the present invention the control circuitry is configured to adjust the output voltage of the DC to DC converter such that the output voltage would produce the desired electric motor performance. As discussed above, this may be done to match the speed of a vehicle to the throttle input of a user. Control circuitry 150 may also, or alternatively, be configured to take an input indicative of a desired torque of an attached motor. Other inputs that may be used by control circuitry 150 according to certain embodiments of the present invention include inputs indicative of a desired motor power, for example. The control circuitry may comprise a mapping from a range of input signals indicative of a desired motor performance to a range of operating parameters of the converter which result in the desired motor performance. For example, a throttle input of 50% may be mapped to a 50% duty cycle for the DC to DC converter as the motor would only require half of the rated voltage to produce half of the rated torque.

Certain embodiments of the present invention provide for a DC to DC converter module which uses a signal indicative of a desired motor torque in order to adjust the DC to DC converter. This could find use, for example, in a car which employs a control scheme that converts a driver's throttle input to a desired motor torque and then inputs this into the DC to DC converter module in order to ensure that the voltage from the electric power source is only raised to a level necessary to produce a current that would result in the desired speed. As discussed above this would help eliminate losses and provide a more efficient vehicle overall.

Certain embodiments of the present invention provide for a DC to DC converter module which takes a signal indicative of a desired electric motor performance as provided by a throttle. The control circuitry 150 may then directly convert this to an appropriate gain for the DC to DC converter or control further elements, such as switches, to arrive at a desired motor performance without needing to employ further electronics typically employed to control a motor between the converter module and motor.

Some embodiments of the present invention provide for a DC to DC converter module 100 which uses a signal indicative of a desired motor speed in order to adjust the DC to DC converter 141. This would find use, for example in a cruise control typically employed in automobiles or in an autopilot employed in an electric aircraft.

Within certain embodiments of the present invention, a single battery cell is employed as the electric power source 180. Within some embodiments the electric power source 180 is a single cell battery. Certain embodiments employ an electrochemical power source. Other embodiments, an electromechanical power source is used, such as, for example, a capacitor.

As seen, DC to DC converter modules 100 according to at least some embodiments of the present invention provide advantages over traditional DC to DC converters. Traditional DC to DC converters raise the voltage to a fixed level which is usually above what is needed to power the motor at a given time. This fixed voltage is then effectively reduced to the level needed to provide the desired power to the motor by modulation or other means. Thus efficiency is lost by raising the voltage to too high a level and then switching this excessively high voltage on and off. For example, the ramp up and ramp down times of electrical components provide for inefficiencies. Within DC to DC converter modules 100 according to the present invention, these ramp up and ramp down times would be avoided by eliminating the necessary switching or conversion operations.

Benefits provided by DC to DC converter modules 100 according to the present invention are further illustrated within electric vehicles. Within many electric vehicles, a large and complex battery pack consisting of many smaller batteries is employed to provide a voltage equivalent to the rated voltage of the vehicles motor or motors without employing DC to DC converters. As discussed above, this is necessary because the individual batteries supply a relatively low voltage. These large battery packs suffer from a shorter service life, are difficult to service and require a great deal of effort to break down their components when the battery life is depleted. Replacement of these large and complex battery packs is made possible by DC to DC converter modules 100 according to the present invention which allow for low voltage energy sources, such as a single battery cell, to be employed in a wide range of applications. By raising the voltage of a low voltage energy source only to a level which is required to meet the present demands on an electric motor, a DC to DC converter module according to the present invention reduces losses. This reduction in losses is experienced at least in part by not operating the DC to DC converter 141 at close to peak output constantly in order to maintain an operating voltage of an electric motor, thus creating a great deal of resistive losses. Further, losses due to the cooling needs of the DC to DC converter 141 are reduced.

Using DC to DC converter modules 100 according to the present invention, electrical efficiencies normally only achieved by using large and complex battery packs may now be achieved with a simple, low voltage energy source. This possibility to employ low voltage energy sources in place of large battery packs results in not only economic but environmental benefits for electric vehicles.

In certain applications it is necessary to provide switches in order to conductively disconnect the motor from a power source, for example, to stop the motor. These switches could also be employed to provide a voltage to the motor which is lower than that provided by the electric power source. Such switches do not need to be included within all DC to DC converter modules 100 according to the present invention as they may be provided elsewhere, for example in an electric drive. The electric drive may then be adapted to take advantage of the benefits of the new DC to DC converter module 100 as provided by the present invention.

At least some DC to DC converter modules 100 according to the present invention comprise a plurality of DC to DC converters 141. These may be arranged in various fashions as will be illustrated below.

Figure 2:
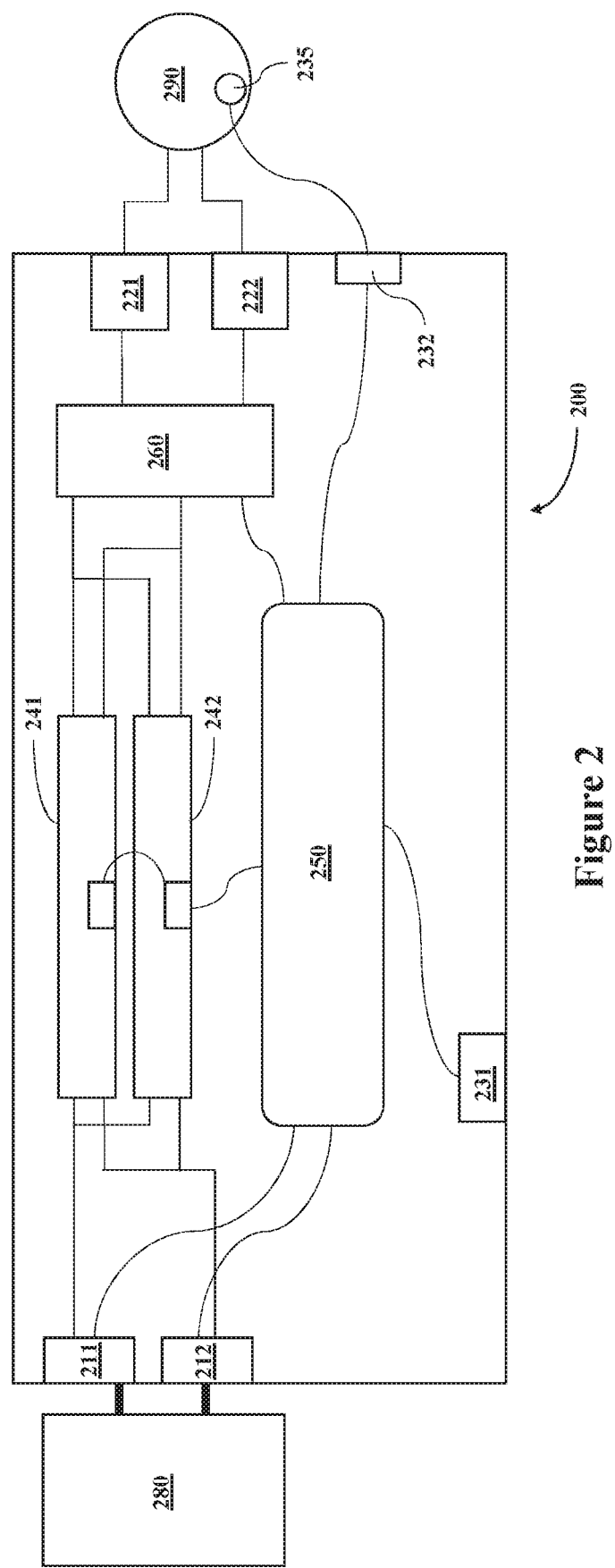
FIG. 2 shows a DC to DC converter module having integrated switches according to some embodiments of the present invention.

FIG. 2 illustrates a DC to DC converter module 200 which includes both a plurality of DC to DC converters 241, 242 and a set of switches 260 comprising at least one switch, according to at least some embodiments of the present invention. The DC to DC converter module 200 is once again configured to be placed between an electric power source 280 and electric motor 290. The DC to DC converter module 200 comprises a plurality of DC to DC converters 241, 242; input terminals 211, 212; output terminals 221, 222; and control circuitry 250 having an input 231 for receiving a signal indicative of a desired electric motor performance as discussed above in the embodiment described for FIG. 1. However within the embodiment of FIG. 2 there is further provided a set of switches 260 between the output terminals 221, 222 and outputs of the DC to DC converters 241, 242. The switches 260 are connected to the control circuitry 250 such that the switches 260 may be controlled by the control circuitry 250. In this embodiment the control circuitry 250 is configured to control the DC to DC converters 241, 242 in order to adjust the output voltage based at least partially on the signal indicative of a desired electric motor performance, received from input 231.

The switches 260 provide the ability to lower the voltage supplied by the electric power source 280 regardless of the type of DC to DC converters employed. Within some embodiments of the present invention the control circuitry 260 is further configured to control the switches 260 and DC to DC converters 241, 242 in order to output a modulated DC voltage. Such modulation may, for example provide a modulated output which lowers an apparent voltage at the output terminals 221, 222 compared to an input voltage received at the input terminals 211, 212. The switches may also be employed to completely disconnect the motor from the electric power source. Within at least some embodiments of the present invention the control circuitry is configured to produce three or more rotating phases required by certain motors, for example a Brushless DC, AC or Switched Reluctance motor. Certain embodiments provide control circuitry which is configured to produce Pulse Width Modulation at the output terminals. DC to DC converters 241 and 242 need not be of the same type, as they may be of different types, for example.

Within at least some DC to DC converter modules 200 having switches according to the present invention, the control circuitry 250 is configured to lower the source voltage by leaving the switches in an open position for a predetermined amount of time. In this fashion an input voltage of, for example 3.2 V, can be converted up to a maximum voltage used by the motor, for example 24 V, while at the same time the input voltage can be lowered from 3.2 V down to any desired voltage including 0 V.

In certain embodiments, when an output voltage lower than the input voltage is desired, current is allowed to flow through the DC to DC converters 241, 242 without any change in voltage. For example, the structure of a boost or buckboost converter allows for current to flow through a diode when no voltage change is desired between the input and the output of the converter.

Also illustrated in FIG. 2 is an optional encoder 235 of the motor 290 which provides information on the motor's performance via an encoder terminal 232 present in DC to DC converter modules 200 according to some embodiments of the present invention. The encoder terminal 232 is conductively connected to the control circuitry 250 in order for the control circuitry 250 to receive measurements of the motor's performance, for example, during control of the DC to DC converters 241 and 242 and switches 260.

Control circuitry 250 according to certain embodiments of the present invention uses both the input indicative of a desired motor performance and the encoder in order to define the frequency and/or phase shift angle for the motor. For example, if the motor is rotating exactly at the desired speed the phase shift angle is kept as 0, but if some change in speed is needed the control circuitry 250 may be configured to start to change the phase shift angle to apply negative or positive torque to the motor shaft in order to achieve the defined speed.

The encoder data is also useful when initially starting certain motors from a stand-still. In such situations, the controller needs to know what position the rotor is in order to be able to start with the right phase in order to ensure that the motor starts to rotate in the desired direction.

Figure 3:
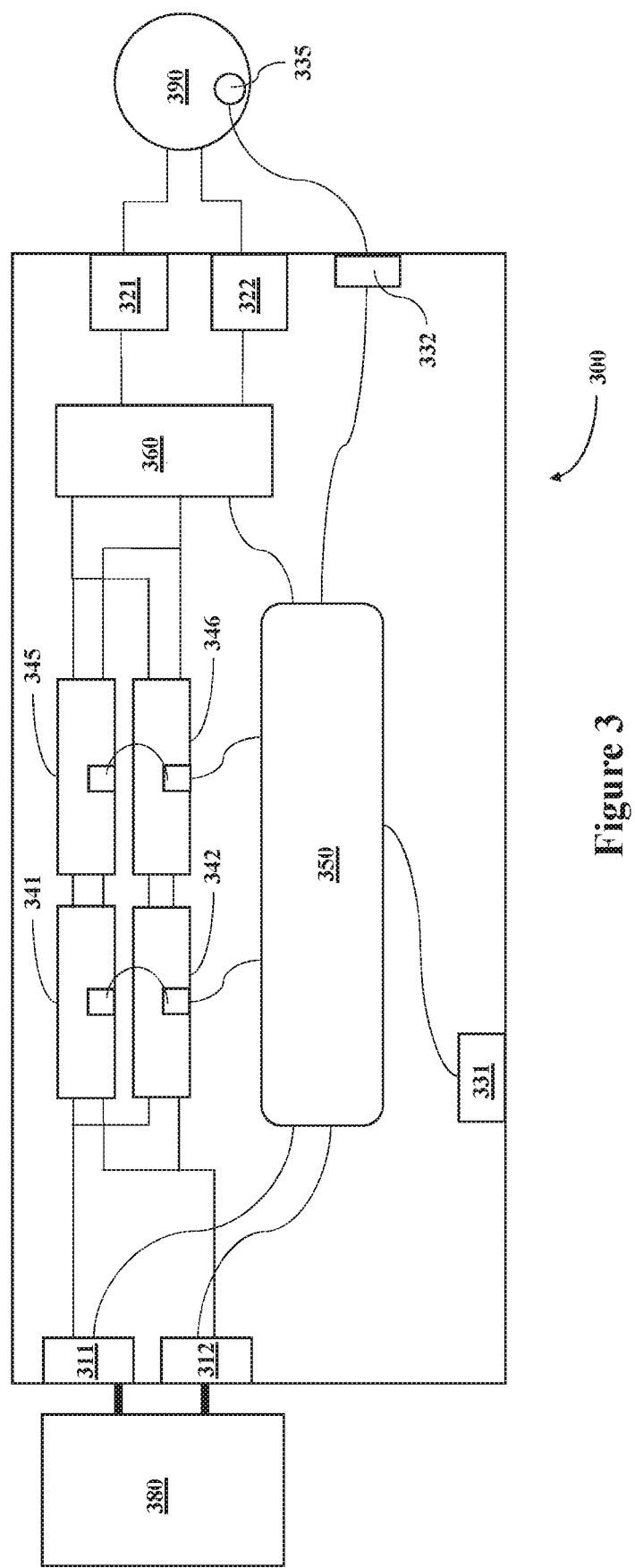
FIG. 3 shows a DC to DC converter module employing a two phase voltage conversion according to certain embodiments of the present invention.

FIG. 3 illustrates a DC to DC converter module 300 which includes two stages of DC to DC converters 341, 342 and 345, 346. As illustrated the first stage 341, 342 is arranged to convert the input voltage to an intermediate voltage and then the second stage 345, 346 is arranged to convert the intermediate voltage to arrive at the output voltage. The DC to DC converter module 300 is once again configured to be placed between an electric power source 380 and electric motor 390. The DC to DC converter module 300 comprises a plurality of DC to DC converters 341, 342, 345, 346; input terminals 311, 312; output terminals 321, 322; and control circuitry 350 having an inputs 331, 332 for receiving a signal indicative of a desired electric motor performance and of the present motor performance; and switches 360 as discussed in the embodiment described above relating to FIG. 2. The optional signal indicative of the present motor performance is once again provided by an encoder 335.

Each of the stages of DC to DC converters may be controlled independently such that a desired intermediate voltage and output voltage is achieved. For example the control circuitry of certain examples of the present invention is configured such that one stage of converters is controlled to step up a voltage to the maximum capability of the converters and the next stage is operated at a much lower gain level. For example, if a very low gain is desired from the DC to DC converter module one stage of converters is operated without any gain at all, merely passing current through the converters. In some embodiments the control circuitry 350 is configured to distribute the total effective voltage gain evenly between converters. As illustrated within FIG. 3, each stage of converters is comprised of two converters; however, it is possible, according to certain embodiments of the present invention, to employ only one converter per stage of converters.

For example, in a DC to DC converter module configured to provide between 0 and 24 V to an attached electric motor when supplied 3.2 V from an electric power source when the desired output is 0%, the converters would output 3.2 V and the switches would be controlled to provide 0 V at the output terminals. When 50% output is desired, the output at the DC to DC converters would be 12 V and when 100% output is desired the output at the DC to DC converters would be 24 V.

In another example DC to DC converter module having two stages of converters and being configured to provide between 0 and 80 V to an attached electric motor when supplied 3.2 V from an electric power source the following outputs would be realized. When the desired output is 0%, the output of both the first stage and second stage of converters would be 3.2 V and the switches would be controlled to provide 0 V at the output terminals of the module. When 50% output is desired, the output at the first stage of DC to DC converters would be 24 V and the output of the second stage of converters would be 40 V. When 100% output is desired the output at the first stage of DC to DC converters would be 24 V and the second stage of converters would be 80 V.

Figure 4:
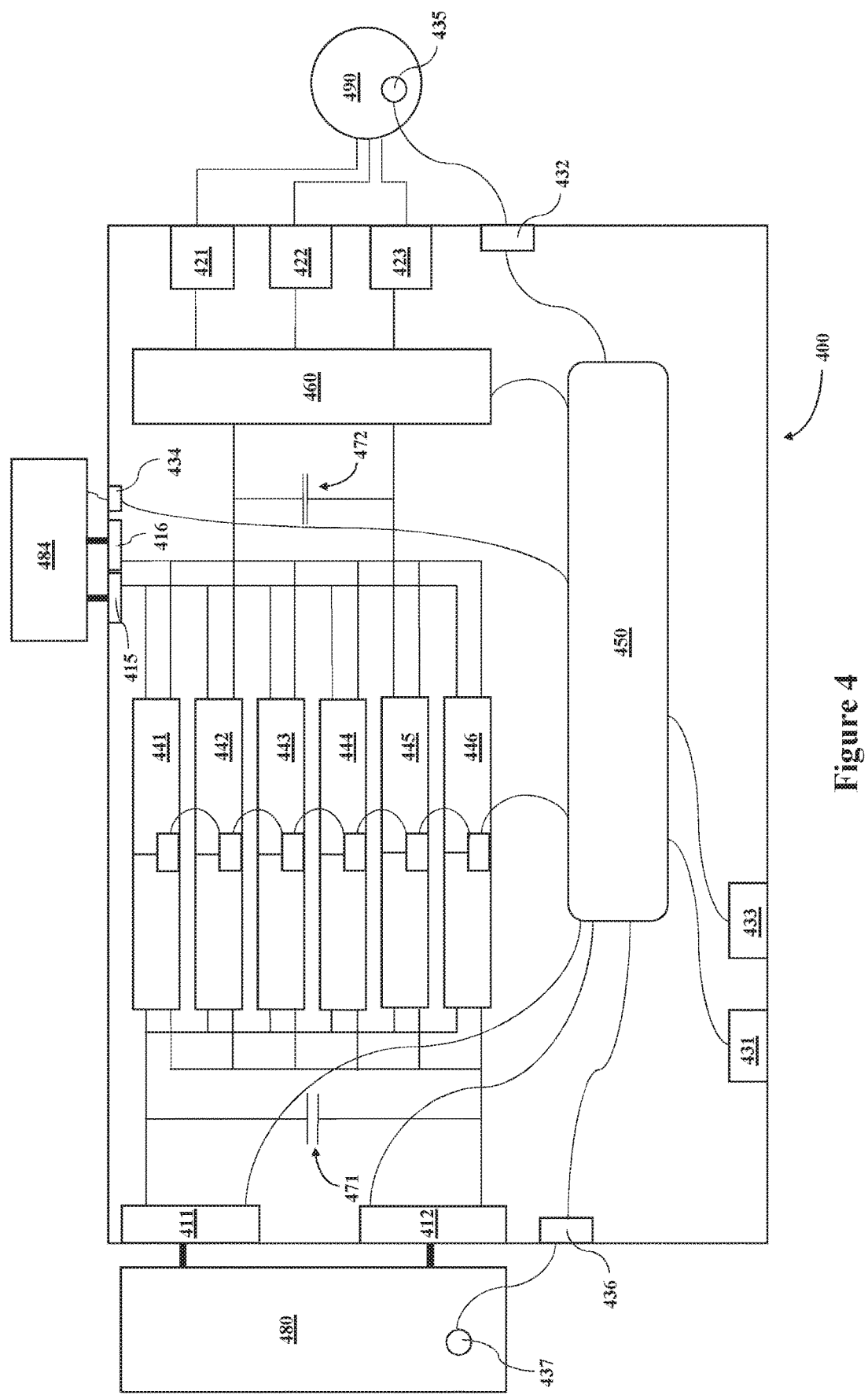
FIG. 4 shows a DC to DC converter module configured for use in certain motor applications according to at least one embodiment of the present invention.

FIG. 4 illustrates a DC to DC converter module 400 configured for use with certain motors, for example brushless DC (BLDC) or AC motors. The DC to DC converter module 400 is once again configured to be placed between an electric power source 480 and electric motor 490. The DC to DC converter module 400 comprises a plurality of DC to DC converters 441-446; input terminals 411, 412; and control circuitry 450 having five inputs 431, 432, 433, 434, 436 for receiving signals from elements outside of the converter module 400. Signals indicative of a desired electric motor performance are received at 431 while signals indicative of the present motor performance are received at 432 as provided by an optional encoder 435 of the motor 490. Optional signals indicative of the present state of the electrical energy source 490, for example a temperature of the electrical energy source 480 are received at input 436 from sensor 437. Switches 460 are again provided between the DC to DC converters 441-446 and the output terminals 421, 422, 423. As also illustrated in FIG. 4, capacitors 471 and 472 are provided to smooth the input and output of the DC to DC converters.

Also illustrated in FIG. 4 are charging terminals 415 and 416. Certain embodiments of the present invention enable charging from an external electricity source 484, such as a charger connected to a wall socket or a battery, which is connected to the charging terminals. As shown the external electricity source 484 is connected between the DC to DC converters and the switches 460. This allows for disconnection from the motor 490 while still allowing for use of the DC to DC converters 441-446 while charging the electrical power source 480. For example, if a DC voltage is supplied at the charging terminals which is lower than the voltage of the electrical power source 480, the DC to DC converters may be employed to raise the charging voltage to a level which will charge the electrical power source 480. The control circuitry 450 may determine the charging voltage by either measuring directly from the charging terminals or by employing an optional charger communication interface connected at 434. This communication interface may provide information to the control circuitry 450 in order to enable a specific charging scheme based on the type of electrical power source 480 employed in a given application.

At least some DC to DC converter modules 400 according to the present invention allow for charging from a source at a voltage equal to or lower than the maximum output voltage of the DC to DC converter module. For example, when a 3.2 volt battery is connected to such a DC to DC converter module designed for use with a motor rated for 80 volts, the module may allow for charging the battery from any source with a voltage below 80 volts.

The DC to DC converter module 400 of FIG. 4 once again employs a two stage conversion of voltage as previously illustrated in FIG. 3. However, within FIG. 4, each DC to DC converters 441-446 is divided into two portions, each portion comprising a separate DC to DC converter. In certain embodiments, in addition to the plurality of DC to DC converters, each DC to DC converter 441-446 comprises control circuitry configured to independently manage control of the voltage conversion based on an input from the control circuitry 450 of the converter module.

As seen in FIG. 4, certain embodiments of the present invention provide for a DC to DC converter module having three output terminals 421, 422, 423 that allow for use certain motors, for example with AC, Brushless DC or Switched Reluctance motors. In such embodiments the control circuitry is configured to operate the switches in order to produce a rotating field at the output terminals such that the attached motor is powered.

Some DC to DC converter modules 400 according to the present invention employ an optional safety level interface 433 for receiving safety control system data from a vehicle. For example, such safety control system data may comprise information on an operating state of the Anti-lock Braking System, ABS, Safety Restraint System, SRS, or Electronic Stability Program, ESP, of the vehicle.

Certain DC to DC converter modules 100, 200, 300, 400 according to the present invention allow for reverse operation, that is, they provide a method for converting inertial energy provided by the electric motor to electrical current which transfers energy to the electric power source. In such modules the control circuitry is configured to control the DC to DC converters, and switches if present, such that the inertial energy provided by the electric motor is converted to electrical energy appropriate to recharge the electrical power source. Such modules may be employed, for example, in a vehicle to enable regenerative braking. This regenerative or reverse operation mode may be enabled when an input signal received by the control circuitry indicates that the desired motor performance is less than a present level of performance.

In some instances of reverse operation the DC to DC converters are in a constant voltage, CV, control mode. The control circuitry of the DC to DC converter module defines a target voltage at the output of the DC to DC converters based on a throttle signal and the DC to DC converters are controlled to attempt to maintain that voltage. The DC to DC converters are then controlled to allow for electricity to flow to the electrical energy source connected to the converter module. For example, when Buck-Boost DC to DC converters are employed in a reverse operation mode, the Buck mode is used to transfer energy from the output of the DC to DC converters to the input and thus to the electrical energy source. In applications employing BLDC or AC motors a motor controller starts to request negative torque from the motor when the speed is higher than desired or when there is negative toque required to maintain the desired output speed or torque. At that point the energy has no other place to go than the output of the DC to DC converters and the above control scheme may be employed to transfer energy from the output of the converters to an energy storage attached to the input of the converters.

Certain embodiments of the present invention provide a method for controlling a DC to DC converter module employed between an electric power source and an electric motor. The DC to DC converter module converts an input voltage provided by the electric source to an output voltage for powering the electric motor. Within such a method a signal indicative of a desired performance characteristic of the electric motor is monitored. From this desired performance characteristics an output voltage is calculated which would provide for the desired characteristic. The DC to DC converter module is then controlled such that the input voltage is converted to the calculated output voltage. In certain embodiments the signal indicative of a desired performance characteristic is non-static. Some embodiments find use when the electric source is a single battery cell.

Some methods provided for by the present invention are employed with a DC to DC converter module which comprises a plurality of DC to DC converters, the DC to DC converters being controlled to output in a sequential fashion. Certain methods are employed with DC to DC converter modules comprising a plurality of switches, the switches being controlled to arrive at a desired output. In some embodiments the switches are controlled to produce a rotating field in order to power an AC motor.

Certain methods according to the present invention employ a signal indicative of a desired motor torque. Others, a desired motor speed. In certain embodiments the signal is controllable by a user. For example, there are multiple motor control schemes employed in an electric or indeed a vehicle employing an internal combustion engine. Torque control which is commonly employed in modern automobiles has a much softer feel to the driver or operator. The pedal or throttle actually determines a desired torque output of the motor. As such a user is inputting a desired torque output of the motor. In contrast to torque control, speed control sets a desired speed of the vehicle and the motor applies a maximum torque in order to accelerate to that speed if necessary.

Certain embodiments of the present invention provide for and some even implement a new type of modulation. As illustrated in FIG. 5A standard Pulse Width Modulation, PWM, approximates first a maximum voltage sinewave using longer pulses and then a half voltage sinewave by using shorter pulses. In each instance the output voltage of the DC source is held at the maximum voltage. FIG. 5B illustrates a new type of modulation made possible by at least some embodiments of the present invention. As can be seen, the output voltage is adjusted based upon the sinewave which is desired. As such the output voltage of the DC source matches the desired peak voltage of the sinewave to be approximated.

Certain embodiments of the present invention allow for improved versions of modulation schemes currently used to power electric motors. For example, by adjusting the voltage input to a standard modulation scheme, the modulation scheme can operate at whatever settings are most efficient while the input voltage adjusted. This could result in a frequency modulation scheme, where a pulse width is maintained but frequency adjusted, that operates at a frequency that is most efficient in terms of power transmitted or harmonics.

As can also be seen in FIG. 5B certain embodiments of the present invention allow for modulated output such that there is one long pulse during the "peak" of the simulated output wave. This lowers the number of pulses necessary to approximate the sinewave and thus eliminates ramp up and ramp down times. As less time is spent in a ramping state, efficiency is increased.

At least some DC to DC converter modules according to the present invention comprise at least one of the following features:
control circuitry which is configured to lower the source voltage by leaving the at least one switch in an open position for a predetermined amount of time;
a throttle which is controllable by a user;
control circuitry which is further configured to control the DC to DC converter such that inertial energy provided by the electric motor provides electrical energy to the electric power source;
an input for receiving measurements of a performance of the electric motor.

At least some methods according to the present invention exhibit at least one of the following elements:
a signal indicative of a desired performance characteristic of an electric motor which is non-static;
an electric power source which is a single batter cell;
the DC to DC converter module is controlled to produce a rotating field in order to power an AC motor.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

| REFERENCE SIGNS LIST | |
|---|---|
| | Definition |
| 100 | DC to DC Converter Module |
| 111, 112 | Input Terminals |
| 121, 122 | Output Terminals |
| 131 | Input for Signal Indicative of Desired Motor Performance |
| 141 | DC to DC Converter |
| 150 | Control Circuitry |
| 180 | Electric Power Source |
| 190 | Electric Motor |
| 200 | DC to DC Converter Module |
| 211, 212 | Input Terminals |
| 221, 222 | Output Terminals |
| 231 | Input for Signal Indicative of Desired Motor Performance |
| 232 | Encoder Terminal |
| 235 | Encoder |
| 241, 242 | DC to DC Converters |
| 250 | Control Circuitry |
| 260 | Set of Switches |
| 280 | Electric Power Source |
| 290 | Electric Motor |
| 300 | DC to DC Converter Module |
| 311, 312 | Input Terminals |
| 321, 322 | Output Terminals |
| 331 | Input for Signal Indicative of Desired Motor Performance |
| 332 | Encoder Terminal |
| 335 | Encoder |
| 341, 342, 345, 346 | DC to DC Converters |
| 350 | Control Circuitry |
| 360 | Set of Switches |
| 380 | Electric Power Source |
| 390 | Electric Motor |
| 400 | DC to DC Converter Module |
| 411, 412 | Input Terminals |
| 415, 416 | Charging Terminals |
| 421-423 | Output Terminals |
| 431 | Input for Signal Indicative of Desired Motor Performance |
| 432 | Encoder Terminal |
| 433 | Safety Level Interface |
| 434 | Charger Communication Interface |
| 435 | Encoder |
| 436 | Energy Source Sensor Input |
| 437 | Sensor |
| 441-446 | DC to DC Converters |
| 450 | Control Circuitry |
| 460 | Set of Switches |
| 471, 472 | Capacitor |
| 480 | Electric Power Source |
| 484 | External Electricity Source |
| 490 | Electric Motor |

The invention claimed is:

1. A direct current (DC) to DC converter module for use between an electric power source and an electric motor, the DC to DC converter module comprising:
  a DC to DC converter;
  input terminals configured to provide a source voltage to the DC to DC converter from the electric power source;
  output terminals connected to outputs of the DC to DC converter and configured to provide an output voltage of the DC to DC converter module to the electric motor; and
  control circuitry connected to the DC to DC converter, the control circuitry having an input for receiving a signal indicative of a desired electric motor performance,
  wherein the control circuitry is configured to adjust a gain of the DC to DC converter in order to vary the output voltage based at least partially on the signal indicative of the desired electric motor performance.

2. The DC to DC converter module of claim 1, wherein the electric power source is a single battery cell.

3. The DC to DC converter module of claim 1, further comprising a plurality of DC to DC converters connected in parallel.

4. The DC to DC converter module of claim 1, wherein the control circuitry is further configured to adjust the output voltage such that the output voltage would produce the desired electric motor performance.

5. The DC to DC converter module of claim 1, further comprising at least one switch between the output terminals and outputs of the DC to DC converter, said at least one switch being controllable by the control circuitry.

6. The DC to DC converter module according to claim 5, wherein the control circuitry is further configured to control the at least one switch and the DC to DC converter in order to output a modulated DC voltage.

7. The DC to DC converter module of claim 5, further comprising at least three output terminals and at least three switches, the control circuitry being further configured to operate the at least three switches in order to produce a rotating field at the output terminals such that an AC motor could be powered.

8. The DC to DC converter module of claim 1, wherein the signal indicative of the desired electric motor performance is indicative of a desired motor torque.

9. The DC to DC converter module of claim 1, wherein the signal indicative of the desired electric motor performance is indicative of a desired motor speed.

10. The DC to DC converter module of claim 1, wherein the signal indicative of the desired electric motor performance is provided by a throttle.

11. The DC to DC converter module of claim 1, wherein there are at least two stages of DC to DC converters, a first stage arranged to convert the input voltage to an intermediate voltage and a second stage arranged to convert the intermediate voltage to the output voltage.

12. The DC to DC converter module of claim 1, wherein the DC to DC converter is selected from: buck-boost, z-source and boost converters.

13. The DC to DC converter module of claim 1, wherein the control circuitry is configured to adjust the gain of the DC to DC converter in order to output a plurality of discrete output voltages.

14. A method for controlling a DC to DC converter module employed between an electric power source and an electric motor, the DC to DC converter module converting an input voltage provided by the electric power source to an output voltage for powering the electric motor, the method comprising:
  monitoring a signal indicative of a desired performance characteristic of the electric motor;
  calculating an output voltage which would arrive at the desired performance characteristic; and
  controlling the DC to DC converter module such that the input voltage is converted to the calculated output voltage.

15. The method of claim 14, wherein the DC to DC converter module further comprises at least one switch, the at least one switch also being controlled to arrive at a desired output.

16. The method of claim 14, wherein the signal indicative of the desired performance characteristic of the electric motor is indicative of a desired motor torque.

17. The method of claim 14, wherein the signal indicative of the desired performance characteristic of the electric motor is indicative of a desired motor speed.

18. The method of claim 14, wherein the signal indicative of the desired electric motor performance is controllable by a user.

\* \* \* \* \*